May 14, 1957 H. WEBER 2,791,802
EXTRUDER
Filed March 4, 1953
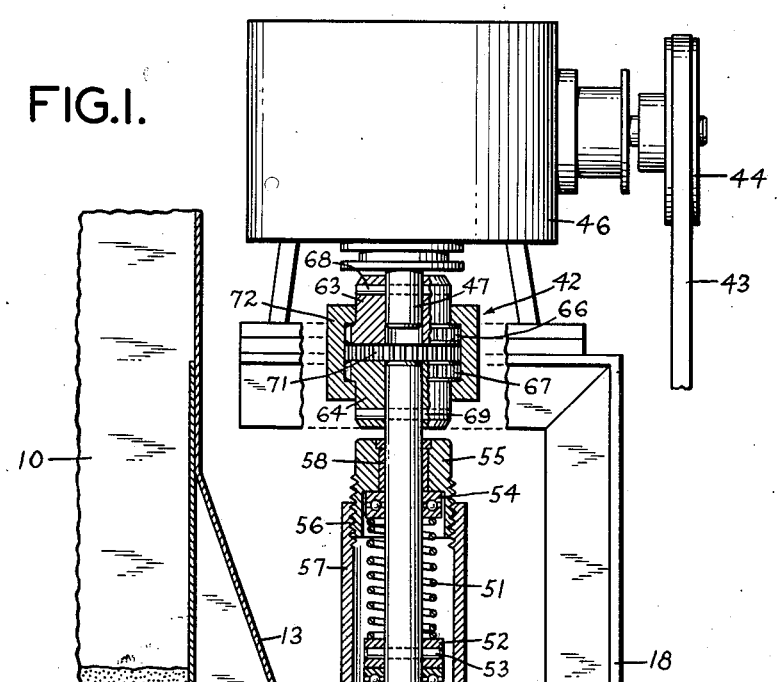
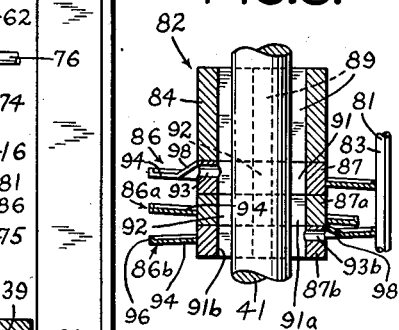
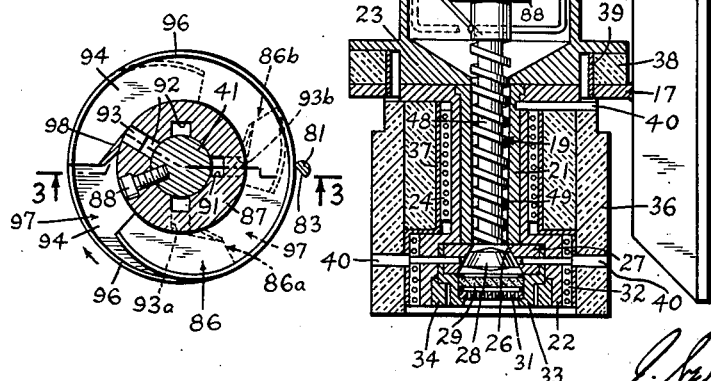
INVENTOR.
HAROLD WEBER
BY
ATTORNEYS.

United States Patent Office 2,791,802
Patented May 14, 1957

2,791,802

EXTRUDER

Harold Weber, Bloomfield, N. J., assignor to Celanese Corporation of America, New York, N. Y., a corporation of Delaware Application March 4, 1953, Serial No. 340,309

7 Claims. (Cl. 18—8)

This invention relates to extrusion of thermoplastic materials and relates more particularly to the melt-spinning of fusible filament-forming materials.

It is an object of this invention to provide a novel apparatus for the melt-spinning of filament-forming materials.

A further object of this invention is the provision of a new and improved apparatus for the production of filamentary materials wherein a comminuted fusible filament-forming material is melted and brought to a uniform density and temperature and is forced through the apertures in a spinnerette in one continuous operation.

It is another object of this invention to provide a new and improved melt-spinning extrusion apparatus wherein variation in the movement of material therethrough is substantially eliminated and substantially uniform filaments are produced.

Other objects of this invention will be apparent from the following detailed description and claims.

The apparatus of the present invention comprises a vessel for receiving comminuted fusible filament-forming material, a jacket communicating with said vessel, a rotatable, axially movable screw for feeding the fusible material through said jacket into an extrusion chamber, means for heating said jacket to render said fusible material highly plastic or molten and resilient means for urging said screw in a direction toward said chamber. The extrusion chamber communicates directly with a spinnerette, so that the screw acts to force the fusible material through said chamber and out through the apertures of the spinnerette, from which it emerges in the form of filaments.

More particularly, the flight of the feed screw is tapered toward its discharge end, and the inner surface of the jacket is correspondingly tapered so that the screw will tend to feed a substantially larger volume of the fusible material into the entrance to the jacket than out of the discharge end of said jacket. Accordingly, during the rotation of the screw the material is compressed as it passes through the jacket. In addition, the rotation of the screw causes the material to be fed in fused condition continuously into the extrusion chamber, but considerable force is required to move this fused material through said extrusion chamber and through the apertures in the spinnerette. As a result, a large axial force, or thrust, is exerted on the screw by the fused material. This thrust, which tends to urge the screw away from the extrusion chamber, is opposed by an adjustable compression spring operatively connected to the screw. The spring is adapted to be preset to keep the screw from moving axially away from the extrusion chamber until the pressure in said chamber becomes greater than the desired spinning pressure. However, when the pressure in the extrusion chamber does exceed the desired value, this pressure will force the screw axially in a direction away from said extrusion chamber.

Although the compression of the spring by the axial movement of the screw is necessarily accompanied by the application of an increased force to the screw by the spring, following Hooke's law, this increased force is balanced by an increased effective area of the molten material in contact with the screw, so that the pressure within the molten material remains substantially constant. This phenomenon can be explained by considering a preferred embodiment of the invention wherein the screw and jacket are mounted vertically with the discharge end of the jacket at the bottom, a small clearance, e. g. .0003 inch, being present between the inner walls of the jacket and the flight of the screw. The heat supply to the jacket and the rotational speed of the screw are so adjusted that the filament-forming material becomes fused or molten at a level just above the discharge end of the jacket, at which level the molten material is in contact with the screw. After this adjustment, the heat supply and rotational speed are maintained substantially constant. When the pressure of the fused material exceeds the desired value, the screw is forced upwards by this increased pressure. Such a rise in the pressure of the fused material may be caused by, for example, intermittent changes in the rate at which the filament-forming material is fed by the screw, which changes may be caused by local variations in the density or melting point of the material. The upward movement of the screw increases the clearance between its flight and the inner walls of the jacket with the result that there is a greater tendency for the fused or molten material in contact with the inner walls of the lower part of the jacket to slip between the flight and said walls. As a consequence, the level of the molten material in the jacket rises. At this higher level the effective area of the screw is larger because of the fact that the width of the flight is increased as one moves up the tapered screw. Accordingly, although the force applied by the spring to the screw is greater, this force is transmitted by the screw to the fused material over a greater area so that the pressure (force divided by area) on the fused material remains substantially constant.

The thermoplastic filament-forming material is agitated and degasified in a vessel located above the heating jacket, which vessel is heated by conduction from said jacket to a moderately elevated temperature, e. g. 150 F., which temperature is insufficient to render said material tacky. The vessel is provided with a wire stirrer and a series of blades and ducts, all of which are mounted, for rotation therewith, on a rotatable shaft passing through the vessel and operatively connected to the feed screw. The wire stirrer serves to move the particles of the material away from the walls of the vessel and onto the blades, while the blades lift the particles and then allow them to drop past the openings of the ducts, which are under reduced pressure, e. g. under a vacuum of 29 inches of mercury. In this manner the occluded gases and water vapor are removed from substantially all of the particles of thermoplastic filament-forming material within the vessel.

The apparatus of this invention is particularly well suited for the production of multifilament filamentary materials in which the individual filaments have a low denier, i. e. a denier of less than about 10 or preferably less than about 5. At these low deniers, any irregularities in the feed or density of the filament-forming material will result in large percentage changes in the denier of the filaments, leading to the production of products that are not commercially acceptable. The apparatus of this invention may be used to obtain products of substantially uniform denier even when starting with filament-forming materials that are bulky and of non-uniform density and contain gases and water vapor.

Filament-forming materials that may be employed in carrying out this invention include, for example, polyamides, polyurethanes, polytriazoles, polyesters and the like.

A preferred embodiment of this invention is shown in the accompanying drawing wherein Fig. 1 is a side elevational view, partly in section, of the apparatus of this invention, Fig. 2 is a cross-sectional view taken along the line 2—2 of Fig. 1 and showing the construction of the ducts and blades, and Fig. 3 is a cross sectional view taken along the line 3—3 of Fig. 2.

Referring now to the drawing, reference numeral 10 designates an air-tight hopper provided with a cover (not shown) and having an outlet 11 controlled by a vertically slidable gate 12 and communicating with an air-tight duct 13. Comminuted thermoplastic filament-forming material is fed from the hopper 10 through the duct 13 into an opening 14 in a vertically positioned cylindrical vessel 16, which vessel is mounted by any suitable means such as screws (not shown) on a bracket 17 of a machine frame 18. In the vessel 16 the material is agitated and degasified by means to be described below, and is forced in a downward direction, by means of a conveyor screw 19, through a hollow jacket 21 located within and supported by a flanged sleeve 22, which is secured to the bottom 23 of vessel 16 and is surrounded by a heat-transfer element 24, which may be an electric heater, or more desirably, a circulating stream of a hot heat-transfer fluid. During its passage through the heated jacket 21, the temperature of the fusible material is raised progressively so that the material emerges from said jacket in a molten condition. This molten material under pressure then passes through an extrusion chamber 26 formed in an annular block 27 in which is mounted a torpedo or spreader 28 supported in said block by means of the conventional spaced radial arms (not shown). The torpedo 28 occupies most of the space within the block 27 so that the extrusion chamber 26 has a small effective volume, the torpedo being so shaped that the material passing through said chamber is spread into a thin film, thus facilitating uniform heating of said material. The molten material then flows under pressure through a conventional sand pack 29 and through a spinnerette 31 having a plurality of apertures which shape the material into filamentary form, a heat-transfer element 32, similar to element 24, being provided around said sand pack and spinnerette, and also around the block 27, to maintain the molten material at the desired elevated temperature. The hot filaments leaving the spinnerette 31 are drawn through a cooling chamber (not shown) in the usual manner.

The spinnerette 31 is mounted within a jet support 33 which is held within the flanged sleeve 22 by means of a ring 34 secured to said sleeve by any suitable means, such as screws (not shown). The flanged sleeve 22, jacket 21, elements 24 and 32, block 27 and spinnerette 31 are all located within a heat-insulatng housing 36 which is lined with heat-reflecting material 37. Similar insulation 38 and heat-reflecting material 39 may be provided around the bottom 23 of the vessel 16, although under some conditions it is necessary to cool said bottom, as by air blasts or cooling coils, not shown, to prevent its temperature from rising to a point where the comminuted material tends to stick to said bottom. It is preferred to measure the temperature and pressure of the material continuously at several points; to this end, wells 40 are provided for the reception of suitable measuring instruments.

The conveyor screw 19 is integral with a shaft 41 extending axially through the vessel 16, which shaft is provided at its upper end with suitable gearing 42 which is driven by a belt 43 through a pulley 44, a transmission 46 and a short shaft 47. The screw 19 has a cylindrical body portion 48 and a tapered flight 49, which is adapted to fit closely against the corresponding tapered frusto-conical inner surface of the jacket 21. Because of this taper the flight 49 will tend to feed a larger quantity by volume of thermoplastic material into the entrance to the jacket than through the remainder of said jacket. Accordingly, during the rotation of the screw 19, the fusible material is compressed as it passes down the jacket 21. Desirably the screw 19 is so tapered that the ratio of the volume of material moved by the upper end of said screw into the entrance to the jacket 21 to the volume of material moved by the lower end of the screw into the extrusion chamber 26, for each revolution of the screw, is equal to the ratio of the absolute density of the solid thermoplastic material to the bulk density, or apparent density, of said material in the comminuted form.

While the rotation of the screw 19 causes molten material to be fed continuously into the space below said screw, considerable force is required to move this material out of this space, past the torpedo 28 and through the sand pack 29 and spinnerette 31. Accordingly, a substantial pressure is built up below the screw 19 and, as a result, a large upward force, or thrust, is exerted on the screw 19 and, therefore, on the shaft 41. This thrust is opposed by a stiff compression spring 51 mounted around the shaft 41 above the vessel 16. The lower end of the spring 51 abuts against a collar 52 which is fixed to the shaft 41 by any suitable means such as a pin 53, while the upper end of said spring presses, through a ball thrust bearing 54, against a cap 55 which is provided with screw threads as shown at 56 and is screwed into the upper end of a housing 57 securely mounted, by any suitable means such as bolts (not shown), at the top of the vessel 16, said vessel being in turn securely mounted on the bracket 17 of the machine frame 18. The housing 57 is also provided with upper and lower bearing sleeves 58 and 59 and with a ball thrust bearing 61 on which the collar 52 of shaft 41 is adapted to rest. Shims 62 are placed between the bottom of the housing 57 and the top of the vessel 16 to adjust the height of the top of the bearing 61 and therefore the position of the shaft 41 and screw 19, said shims being of such thickness that when the collar 52 rests on the bearing 61 there will be a very small clearance, e. g. 0.0003", between the flight 49 of said screw and the inner surface of the jacket 21. For example, if the taper of said flight and surface is 1 in 50 and said flight and surface are initially in contact, an upward movement of the screw 19 of 0.005 inch will produce a clearance of 0.0001 inch between said flight and said surface.

The degree of initial compression of the spring 51 may be adjusted by rotating the threaded cap 55 so as to move said cap and the abutting thrust bearing 54 up or down. In this manner the spring 51 may be preset so that the shaft 41 cannot be moved upwards unless there is exerted on said shaft a predetermined force corresponding to a spinning pressure slightly above the desired spinning pressure. That is, the spring 51 should be preset so that, when the pressure of the molten material at the bottom of the screw 19 exceeds the desired value, said screw will move axially upwards a small extent. As previously pointed out, when the screw 19 moves upwards, thus further compressing the spring 51, the increased force exerted by said spring is balanced by an increased effective area of the molten material in contact with the screw, so that the pressure (force divided by area) exerted on the molten material remains substantially constant.

The gearing 42, at the top of the shaft 41, is so constructed that said shaft may be moved axially without affecting its rotational movement. Thus, spaced upper and lower spur gears 63 and 64, having teeth 66 and 67, are mounted on the shafts 47 and 41, respectively, by any suitable means such as pins 68 and 69. The teeth of both spur gears 63 and 64 are engaged by long internal teeth 71 of the split ring gear 72, of conventional construction, which encircles both of said spur gears and transmits the motion of the upper gear 63 to the lower gear 64. When the shaft 41 moves upwardly the teeth of the lower gear 63 slide on the teeth of the ring gear 72, but the gears remain in mesh.

As stated, the thermoplastic material is degasified within the vessel 16, which is cylindrical in shape and comprises a cover 73, side walls 74 and a tapered bottom 23. By suitable adjustments of the gate 12 of the hopper 10, the level of the mass of particles within the vessel 16 is maintained at about the level indicated by the line 75 in Fig. 1. Vacuum is applied at the top of the vessel 16 by means of a pipe 76 connected to a suitable vacuum pump (not shown). The particles are prevented from being sucked into the pipe 76 by a slotted rotating disk 77, having a hub 78 mounted on the shaft 41, provided with vanes formed by downwardly bent portions adjacent to each of its slots. To insure that all of the particles within the vessel will be exposed adequately to the reduced pressure there are provided a wire stirrer 81 and an agitating and degasifying assembly 82, both mounted on the long shaft 41. The stirrer 81 comprises a length of wire fixed at both ends to the shaft 41 and so shaped and mounted that it conforms closely to the outlines of the walls 74 of the vessel 16. At one side 83 (Fig. 2) the wire of stirrer 81 is bevelled so that during the rotation of said stirrer it acts to direct the comminuted material away from the walls 74 and also acts to break up any clumps of material entering the vessel 16. The assembly 82 comprises a collar 84 and three annular members 86, 86a and 86b having hubs 87, 87a, 87b, said collar and said annular members being secured to the shaft 41 by any suitable means, such as screws 88 engaging in holes in said shaft. The collar 84 is provided with four spaced internal longitudinal grooves 89, similar grooves 91, 91a, 91b being provided in the hubs 87, 87a, 87b. The collar 84 and said hubs are mounted on the shaft 41, one above the other, with said grooves in alignment, so that said aligned grooves constitute a plurality of individual passageways 92 spaced around the circumference of said shaft with each passageway extending from the top to the bottom of the assembly 82. The hubs 87, 87a, 87b have radial ports 93, 93a, 93b extending into the grooves 91, 91a, 91b, respectively, one such port being provided in each hub, the positions of said ports being staggered around the shaft so that each port extends into a different passageway 92. Helical blades or flights 94, having raised rims 96, are welded to and extend almost entirely around the hubs 87, 87a, 87b, there being circumferential spaces 97 (Fig. 2) between the upper and lower ends of said blades. The upper end portions of these blades 94 are located relatively close to ports 93, 93a, 93b and have upwardly bent inner portions 98 clearing said ports, the blades being staggered around the shaft 41 in the same relationship as said ports. It will be noted that the blades 94 constitute a discontinuous screw flight whose pitch is opposite to that of the flight of the extrusion screw 19.

During the rotation of the shaft 41 in the direction indicated by the arrows in Figs. 1 and 2, the blades 94 move through the mass of particles of thermoplastic material in the vessel 16, lifting said particles and permitting them to drop through the spaces 97, where they are exposed to the reduced pressure adjacent to the ports 93, 93a, 93b. It will be apparent that the pressure adjacent to the ports 93, 93a, 93b is lower than that which obtains at other points at the same levels in the mass of particles in vessel 16, since said ports and the passageways 92 provide a more direct route for the flow of gases to the upper, evacuated, portion of said vessel, while the mass of particles within the vessel offers considerable resistance to the flow of gases therethrough. The action of the stirrer 81 forces any particles which may be positioned adjacent to the walls 74 at the level of the assembly 82 onto the blades 94, whose rims 96 are located close to said stirrer. Because of the shape and staggered relationship of the blades 94, the rotation of said blades brings substantially all of the particles into a position close to the ports 93, 93a, 93b while said particles are in a separated condition, so that occluded gases and water vapor may be removed from said particles in a highly efficient manner. As previously noted, the bottom 23 of the vessel 16 is maintained at an elevated temperature by heat conducted from the heater 24; this also aids in removing occluded gases and water from the particles.

To prevent the outside air from entering the vessel 16, any convenient sealing arrangement may be provided. For example, I may employ gaskets (not shown) at the top and bottom, respectively, of the vessel 16 and an O-ring 101 positioned in the cover 73 and around the shaft 41.

It is to be understood that the foregoing detailed description is given merely by way of illustration and that many variations may be made therein without departing from the spirit of my invention.

Having described my invention, what I desire to secure by Letters Patent is:

1. An apparatus for the extrusion of thermoplastic material, comprising a vessel, means for entering a comminuted thermoplastic material into said vessel, a jacket communicating with said vessel, an extrusion chamber communicating with said jacket, a rotatable shaft in said vessel, means for agitating the comminuted thermoplastic material in said vessel comprising a screw flight mounted on said shaft and within said vessel, a feed screw at the end of said shaft and within said jacket for forcing said thermoplastic material into and through said extrusion chamber, said feed screw having a flight the pitch of which is opposite to that of said first-mentioned flight, and a spring for urging said shaft in a direction toward said extrusion chamber.

2. An apparatus as set forth in claim 1 and further comprising means for directing the comminuted material in said vessel away from a wall of said vessel and toward said first-mentioned flight.

3. An apparatus for the extrusion of thermoplastic material, comprising a vessel, means for entering a comminuted thermoplastic material into said vessel, a jacket communicating with said vessel, an extrusion chamber communicating with said jacket, a rotatable shaft in said vessel, a discontinuous screw flight mounted on said shaft and within said vessel, means connected to said vessel for applying a vacuum thereto, a feed screw at the end of said shaft and within said jacket for forcing said thermoplastic material into and through said extrusion chamber, said feed screw having a flight the pitch of which is opposite to that of said discontinuous flight, a spring for urging said shaft in a direction toward said extrusion chamber, and means for heating said jacket to render said thermoplastic material highly plastic.

4. An apparatus for the extrusion of thermoplastic material, comprising a vessel, means for entering a comminuted thermoplastic material into said vessel, a jacket communicating with said vessel, an extrusion chamber communicating with said jacket, a rotatable shaft in said vessel, a discontinuous screw flight mounted on said shaft and within said vessel, means connected to said vessel for applying a vacuum thereto, a feed screw at the end of said shaft and within said jacket for forcing said thermoplastic material into and through said extrusion chamber, said feed screw having a flight the pitch of which is opposite to that of said discontinuous flight, a spring for urging said shaft in a direction toward said extrusion chamber, and means for heating said jacket to render said thermoplastic material highly plastic.

5. An apparatus for the extrusion of thermoplastic material, comprising a vessel, means for entering a comminuted thermoplastic material into said vessel, a jacket communicating with said vessel, an extrusion chamber communicating with said jacket, a rotatable shaft in said vessel, a discontinuous screw flight mounted on said shaft and within said vessel, means in said vessel for applying a vacuum at points adjacent to said discontinuous flight, a feed screw at the end of said shaft and within said jacket for forcing said thermoplastic material into and through said extrusion chamber, said feed screw having a flight the pitch of which is opposite to that of said discontinuous flight, a spring for urging said shaft in a direction toward said extrusion chamber, and means for heating said jacket to render said thermoplastic material highly plastic.

6. An apparatus for the extrusion of thermoplastic material, comprising a vessel, means for entering a comminuted thermoplastic material into said vessel, a jacket communicating with said vessel, an extrusion chamber communicating with said jacket, a rotatable shaft in said vessel, a discontinuous screw flight mounted on said shaft and within said vessel, a plurality of collars on said shaft adjacent to said discontinuous screw flight, ducts in said collars for applying a vacuum in the vicinity of said discontinuous screw flight, a feed screw at the end of said shaft and within said jacket for forcing said thermoplastic material into and through said extrusion chamber, said feed screw having a flight the pitch of which is opposite to that of said discontinuous flight, a spring for urging said shaft in a direction toward said extrusion chamber, and means for heating said jacket to render said thermoplastic material highly plastic.

7. An apparatus for the production of filamentary materials by the melt spinning of a filament-forming material, comprising a vessel, means for entering a comminuted filament-forming material into said vessel, a jacket communicating with said vessel, an extrusion chamber communicating with said jacket, a spinnerette operatively connected to said extrusion chamber, a rotatable shaft in said vessel, a discontinuous screw flight mounted on said shaft and within said vessel, a plurality of collars on said shaft adjacent to said discontinuous screw flight, ducts in said collars for applying a vacuum in the vicinity of said discontinuous screw flight, a feed screw at the end of said shaft and within said jacket for forcing said filament-forming material into and through said extrusion chamber and spinnerette, said feed screw having a flight the pitch of which is opposite to that of said discontinuous flight, a spring for urging said shaft in a direction toward said extrusion chamber, and means for heating said jacket to render said thermoplastic material highly plastic.

References Cited in the file of this patent

UNITED STATES PATENTS

| | | |
|---|---|---|
| 1,156,096 | Price | Oct. 12, 1915 |
| 2,303,340 | Dreyfus | Dec. 1, 1942 |
| 2,336,159 | Bent | Dec. 7, 1943 |
| 2,370,469 | Johnson | Feb. 27, 1945 |
| 2,471,813 | Cousino | May 31, 1949 |
| 2,615,199 | Fuller | Oct. 28, 1952 |
| 2,707,306 | Weber et al. | May 3, 1955 |

FOREIGN PATENTS

| | | |
|---|---|---|
| 809,469 | France | Dec. 12, 1936 |